Figure 1:
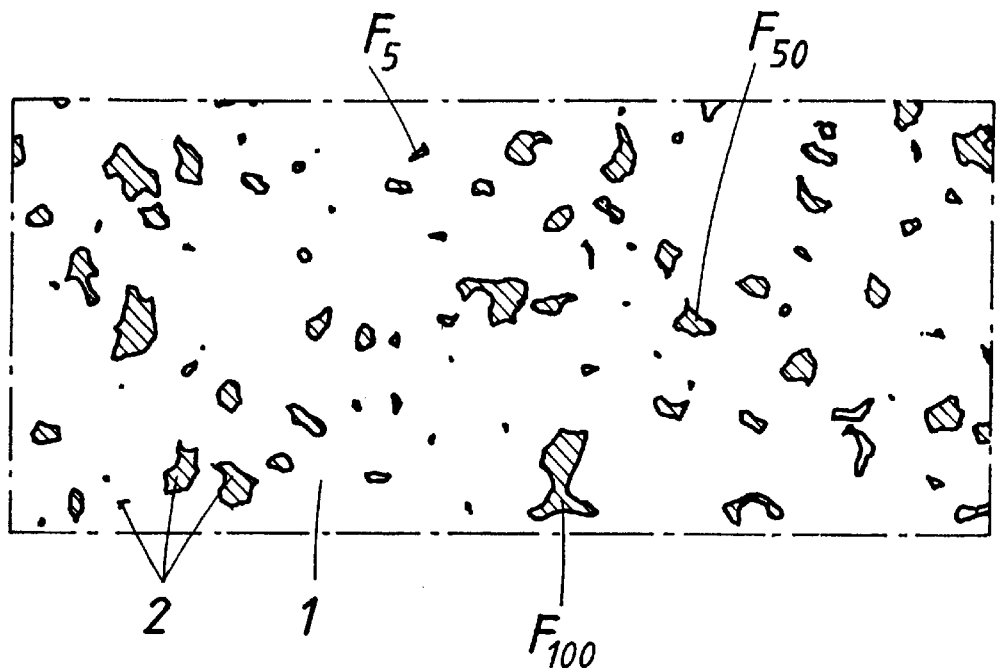

United States Patent [19]
Rumpf et al.

[11] Patent Number: 6,022,629
[45] Date of Patent: Feb. 8, 2000

[54] COPPER-BASED SLIDING SURFACE

[75] Inventors: Thomas Rumpf; Walter Gärtner, both of Gmunden, Austria

[73] Assignee: Miba Gleitlager Aktiengesellschaft, Laakirchen, Austria

[21] Appl. No.: 08/981,974

[22] PCT Filed: Jul. 4, 1996

[86] PCT No.: PCT/AT96/00118

§ 371 Date: Jan. 9, 1998

§ 102(e) Date: Jan. 9, 1998

[87] PCT Pub. No.: WO97/03228

PCT Pub. Date: Jan. 30, 1997

[30] Foreign Application Priority Data

Jul. 12, 1995 [AT] Austria ................................ 1183/95

[51] Int. Cl.[7] ........................... F16C 33/12; C22C 29/12; B22F 7/04
[52] U.S. Cl. ........................ 428/553; 428/674; 428/677; 384/910; 384/912; 420/591; 75/247
[58] Field of Search ..................................... 384/910, 912; 420/591; 75/247; 428/553, 674, 677

[56] References Cited

U.S. PATENT DOCUMENTS

| | | | |
|---|---|---|---|
| 4,941,919 | 7/1990 | Asada | 75/235 |
| 5,004,581 | 4/1991 | Takagi | 420/487 |
| 5,045,405 | 9/1991 | Koroshetz | 428/612 |
| 5,242,717 | 9/1993 | Tanaka | 427/455 |
| 5,346,668 | 9/1994 | Tanaka | 420/485 |
| 5,413,875 | 5/1995 | Tanaka | 428/645 |

FOREIGN PATENT DOCUMENTS

| | | |
|---|---|---|
| 0 143 449 | 6/1985 | European Pat. Off. . |
| 0 256 226 | 2/1988 | European Pat. Off. . |
| 0 300 993 | 1/1989 | European Pat. Off. . |
| 0 307 189 | 3/1989 | European Pat. Off. . |
| 41 42 454 | 7/1992 | Germany . |
| WO87/07308 | 12/1987 | WIPO . |

OTHER PUBLICATIONS

J.A. Thornton and A.S. Penfold: *Thin Film Processes*, pp. 103–105, 1978.

*Primary Examiner*—Timothy M. Speer
*Assistant Examiner*—Bryant Young
*Attorney, Agent, or Firm*—Collard & Roe, PC

[57] ABSTRACT

There is described a copper-based sliding layer comprising a matrix of copper or a copper alloy with softer metallic inclusions of at least 10 wt-% which form particles having sectional areas separate from each other with respect to an observation plane parallel to the layer. To combine favorable strength values with good tribological properties, it is suggested that when adding up the sectional areas of the particles starting with the smallest sectional area and proceeding according to ascending area size the sectional area ($F_{50}$) of that particle which completes the subtotal of the sectional areas up to its own area size to 50% of the final total corresponds to a maximum of ten times the sectional area ($F_5$) of the particle completing the subtotal to 5% of the final total, but at least one fifth of the largest individual sectional area ($F_{100}$).

6 Claims, 2 Drawing Sheets

COPPER-BASED SLIDING SURFACE

This invention relates to a copper-based sliding layer, comprising a matrix of copper or a copper alloy with softer metallic inclusions of at least 10 wt-%, which form particles having sectional areas separate from each other with respect to an observation plane parallel to the layer.

Cast or sintered sliding layers of lead-containing bronzes, which usually have a tin content between 1 and 5 wt-% and a lead content of 10 to 30 wt-%, exhibit a heterogeneous structure characteristic of the respective production process and dependent on the tin and lead contents with a wide statistical scatter of the mean particle diameters related to the individual lead particles. During the casting process, lead accumulates in the interdendritic spaces of the solidifying bronze, where the size of the lead particles increases with decreasing rate of solidification, which leads to a correspondingly wide Gaussian distribution of the size of the lead precipitates. In the case of sintered lead bronzes, a similar random distribution of the lead particle sizes is observed, but for a different reason. Since the coagulation and growth processes taking place during sintering are not uniform, the originally very fine lead distribution in the sintering powder leads to different lead particle sizes, which lie in a wide range of scatter.

With increasing lead content, bronze-containing sliding layers made both by casting and by sintering include coarser and in part coherent lead phases, which provide lower strength values with good tribological properties of the sliding layer. For higher strength requirements, it was therefore necessary to restrict the lead content to e.g. 15 wt-% and accept the less favorable tribological properties of the sliding layer involved in such restriction. Attempts at making a sliding layer with a particularly fine lead distribution, for instance with mean particle diameters smaller than 1 $\mu$m, by means of an electrodeposition or a physical deposition, have led to higher strength values as expected, but despite the increased lead content up to 35 wt-%, the tribological properties of the sliding layer have surprisingly hardly improved.

It is therefore the object underlying the invention to improve a copper-based sliding layer as described above such that good tribological properties corresponding to the higher contents of softer inclusions can be combined with advantageous strength values.

This object is solved by the invention in that when adding up the sectional areas of the particles starting with the smallest sectional area and proceeding according to ascending area size, the sectional area of that particle which completes the subtotal of the sectional areas up to its own area size to 50% of the final total corresponds to a maximum of ten times the sectional area of the particle completing the subtotal to 5% of the final total, but at least one fifth of the largest individual sectional area.

The invention is based on the knowledge that for the tribological properties of a copper-based sliding layer having for instance softer lead inclusions, not only the proportion of the lead inclusions, but also their size distribution is decisive, namely in particular in the sliding surface and/or in an observation plane parallel to the layer. When the sectional areas between the lead particles and the observation plane lie within a limited range of sizes, unexpectedly good tribological properties can surprisingly be achieved for the sliding layer. Although the causes therefor have not yet been clarified completely, it is assumed that due to the much more uniform structure of the inclusions as compared to the conventional wide random distribution of sizes of the lead phases neither the strength of the sliding layer is locally impaired by larger coherent lead phases nor is there obtained a significant content of lead inclusions, which as a result of the small particle size can hardly contribute to the tribological properties. As accordingly both the size of the sectional areas of the lead particles and their size distribution are decisive, the sectional areas of the particles are added up according to ascending area size, so as to be able to determine the range of sizes of the sectional areas relevant for the desired effect. The total of the smallest sectional areas of the particles obtained in the observation plane should not be more than 5% of the total of all sectional areas, when the largest of these smallest sectional areas negligeable for the tribological effect corresponds to at least one tenth of the sectional area of that particle which completes the subtotal of the sectional areas up to its own area size to 50% of the final total. The sectional area of this particle completing the subtotal to 50% of the final total should in turn not be smaller than one fifth of the largest individual sectional area of all particles, so as to maintain the desired size distribution with respect to the total area.

As has already been explained, there should be no coherent inclusions with a larger sectional area impairing the required strength. This will generally be ensured when the sectional area of that particle which completes the subtotal of the sectional areas up to its own area size to 50% of the final total is not more than 10 $\mu$m$^2$. In practice, there is likewise a lower limit, which for the sectional area of the particle completing the subtotal of the sectional areas to 50% of the final total can be determined to be at least 0.1 $\mu$m$^2$. Particularly advantageous results are obtained in this connection when the sectional area of this particle related to 50% of the final total lies between 0.5 and 4 $\mu$m$^2$.

In accordance with a further embodiment of the invention, particularly favorable structural conditions are achieved in that the sectional area of that particle which completes the subtotal of the sectional areas up to its own size to 50% of the final total corresponds to a maximum of seven times, preferably not more than six times the sectional area of the particle completing the subtotal to 5% of the final total. In addition, the maximum admissible ratio between the area size of the particle completing the subtotal of the sectional areas up to its own area size to 50% of the final total and the largest individual sectional area can be reduced to 1:4. These size relations provide for a closer distribution of the sizes of the sectional areas with an advantageous effect on the tribological properties of the sliding layer without impairing the strength thereof. It need probably not be particularly emphasized that the notes on the lead inclusions also apply to other softer inclusions, for instance bismuth, in the matrix of copper or a copper alloy.

To obtain an inventive sliding layer, a supporting shell made of steel was coated in an electrolytic bath, which consisted of copper, lead and nickel salts, an additive of a conducting salt increasing the electrical conductivity, and an appropriate system of additives comprising surfactants and brighteners in a proportion suitable for a sliding layer of 60% copper, 30% lead and 10% nickel, with an average current of 4 A/dm$^2$. The sliding layer formed had a hardness of 370 UMVH 5p and was still not suited as sliding material. It was only by means of a heat treatment at a temperature lying above one third of the absolute melting point of the matrix material, but below the melting point of the soft phase, for a period of 1 to 10 hours, that the structure in accordance with the invention could be achieved, which provides excellent sliding properties and a good corrosion resistance with respect to the corrosive constituents contained in lubricating oils and combustion gases. After such treatment, the ultramicrohardness was 150 UMHV 5p.

Another possibility of producing a sliding layer in accordance with the invention consists in that on a cast carrier material of a lead bronze a sliding layer of 60% copper, 30% lead and 10% nickel is physically applied in a vacuum by means of cathode sputtering. By sputtering the correspondingly composed cathode the copper material is crystallized on the carrier material and at the same time the soft lead is included in the basic material in a fine distribution. Cathode sputtering may for instance be performed at a temperature of about 80° C. and with an argon atmosphere in a vacuum of $2 \times 10^{-3}$ mbar, where the temperature of the cast carrier material is kept constant and lies below the melting point of the lead material.

The sliding layer in accordance with the invention may, however, also be produced by casting. The melt consisting for instance of copper with 25% lead and 3% tin may in this case be cast onto a carrier material in an appropriate casting device, so that the solidification of the matrix and hence the lead precipitation is effected very quickly to obtain a uniform and fine structure. To achieve the desired casting result, the temperature of the melt, the preheating temperature of the carrier material, the casting speed and the casting thickness may be adjusted accordingly.

Figure 2:
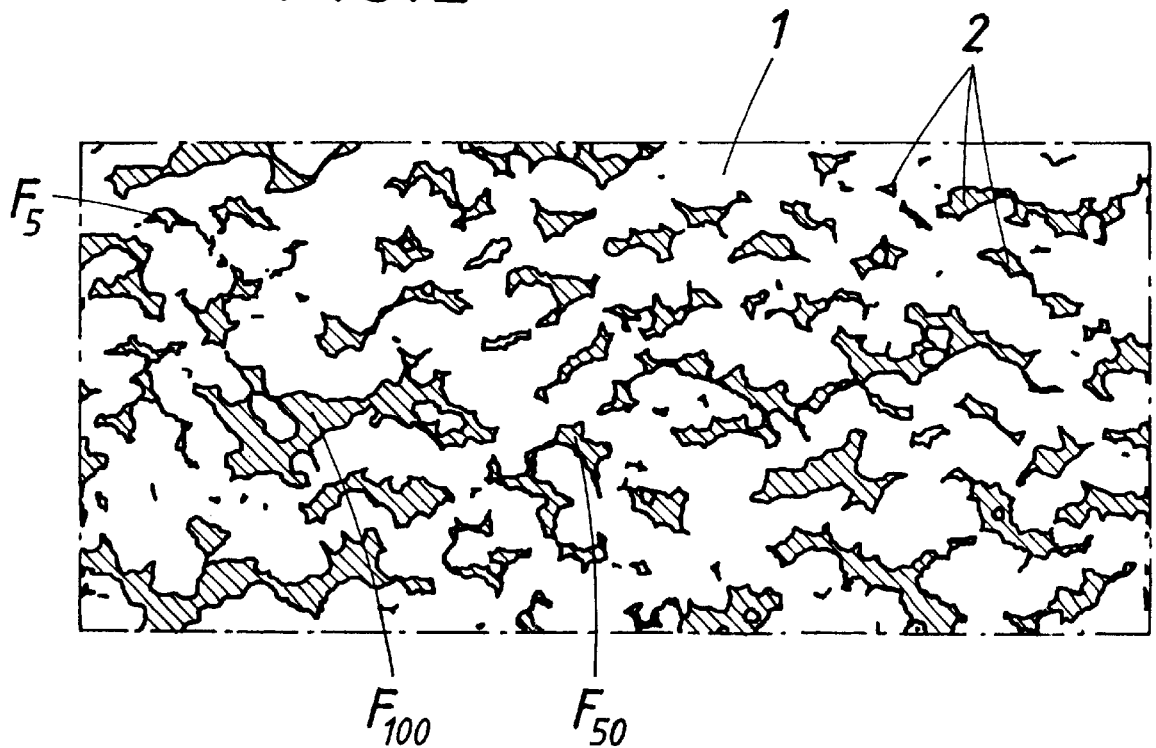
Figure 3:
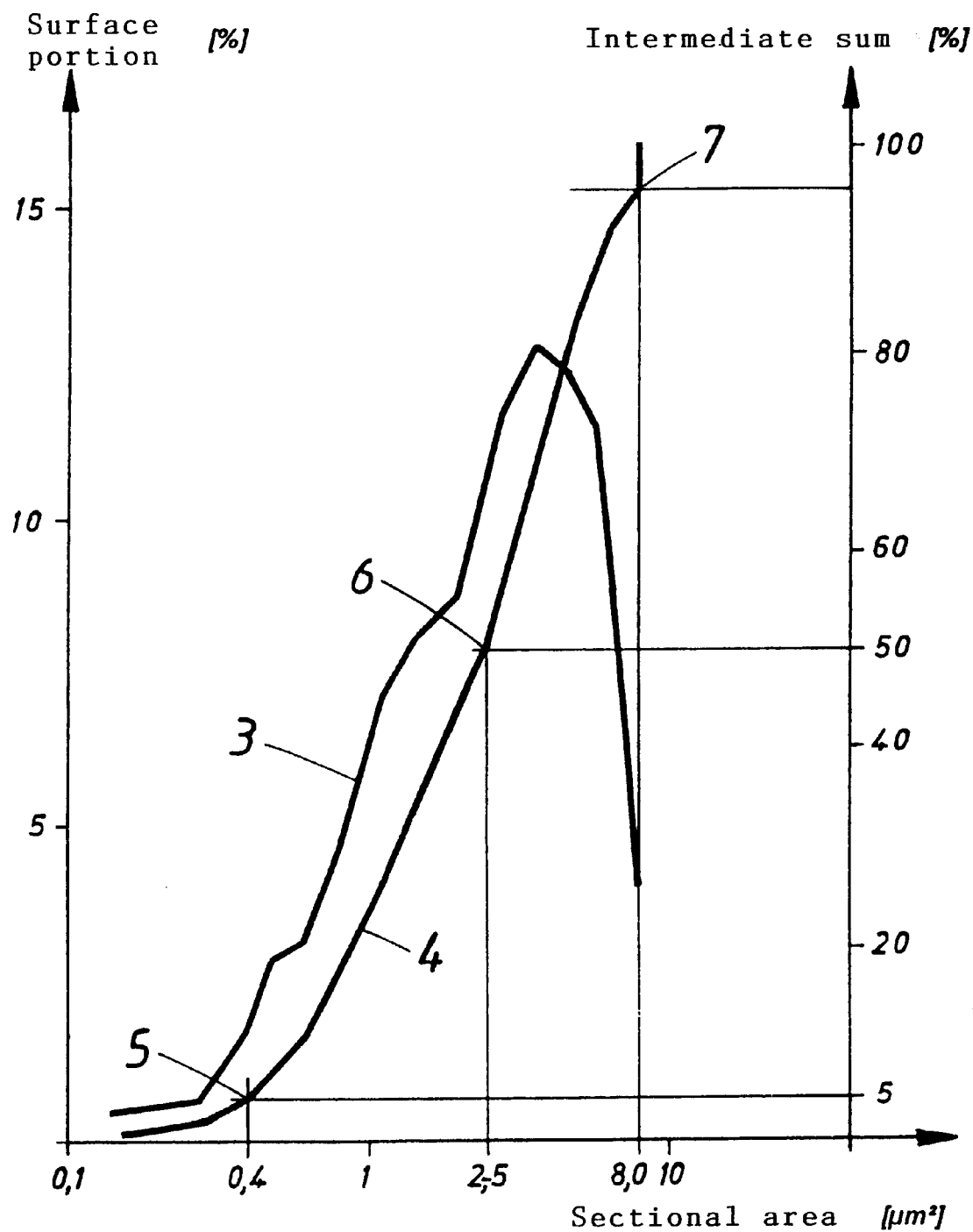

In the drawing, the subject-matter of the invention is represented schematically, wherein:

FIG. 1 schematically represents an inventive sliding layer in a section parallel to the layer on an enlarged scale, FIG. 2 shows a representation corresponding to FIG. 1 of a constructional variant, and FIG. 3 is a graphical representation of the distribution of the sizes of the sectional areas of the lead particles in an observation plane parallel to the layer, which on top of the size of the sectional areas plotted on the abscissa on a logarithmic scale on the one hand illustrates the proportion of the respective size of the sectional areas in the total amount of the sectional areas of all lead particles and on the other hand the sum of the sectional areas added up according to ascending area size.

FIG. 1 shows a micrograph of an electrodeposited sliding layer in accordance with the invention in a schematic representation. In the illustrated ground surface parallel to the layer, the softer lead particles 2 included in the basic material 1 form sectional areas which can be measured and added up according to size in ascending order. The sectional area which completes the subtotal of the sectional areas to 5% of the final total is designated with $F_5$ and in the selected embodiment, which has a lead content of 20%, has a size of 0.11 $\mu m^2$. Accordingly, that lead particle whose sectional area completes the subtotal of the sectional areas to 50% is indicated as $F_{50}$, and the largest individual sectional area is indicated as $F_{100}$. The sectional area $F_{50}$ is 0.63 $\mu m^2$, the sectional area $F_{100}$ is 2.19 $\mu m^2$.

The embodiment in accordance with FIG. 2 illustrates the typical conditions in a sliding layer physically applied in a vacuum by means of cathode sputtering. In the basic material 1 lead particles 2 are again included, which amount to a weight content of 28%. The sectional areas $F_5$, $F_{50}$ and $F_{100}$ are again represented, where these areas amount to 0.10 $\mu m^2$, 0.51 $\mu m^2$ and 1.73 $\mu m^2$.

In FIG. 3 the sectional areas of the lead inclusions 2 of a sliding layer characteristic of the invention, which are visible in the ground surface, are plotted according to size on the abscissa, and their proportion of the total area of all measured sectional areas is plotted on the ordinate, so that the graph 3 resulting therefrom illustrates the size distribution of the sectional areas of the lead particles 2 in the ground surface. To avoid the gradation of graph 3 resulting from the individual sectional areas of a specimen, graph 3 was made by means of sliding averages. Graph 4 illustrates the course of the subtotal of the individual sectional areas when adding up the sectional areas of the lead particles starting with the smallest sectional area and proceeding according to ascending area size. These graphs were made for a specimen which as compared to the embodiments of FIGS. 1 and 2 had coarser inclusions. From these graphs 3 and 4 it can be derived that with a subtotal of 5% corresponding to the intersection 5 a sectional area $F_5$ of approximately 0.4 $\mu m^2$ is achieved, and with a subtotal of 50% corresponding to the intersection 6 a sectional area $F_{50}$ of about 2.5 $\mu m^2$ is achieved. The largest individual sectional area $F_{100}$, which according to the intersection 7 completes the subtotal to the final total, is 8 $\mu m^2$. There is thus obtained a distribution where the ratio of the sectional area $F_5$ of the lead particle in the vicinity of the subtotal of 5% to the sectional area $F_{50}$ in the vicinity of the subtotal of 50% is about 1:6. The largest individual sectional area $F_{100}$ approximately corresponds to 3.2 times the sectional area $F_{50}$ of the particle in the vicinity of the subtotal of 50%.

We claim:

1. A copper-based sliding layer, comprising a matrix of copper or a copper alloy with softer metallic inclusions of at least 10 wt-%, which form particles having sectional areas separate from each other with respect to an observation plane parallel to the layer, wherein, when adding up the sectional areas of the particles starting with the smallest sectional area and proceeding according to ascending area size, the sectional area of that particle which completes the subtotal of the sectional areas up to its own area size to 50% of the final total corresponds to no more than 10 $\mu m^2$, but at least one fifth of the largest individual sectional area.

2. The sliding layer as claimed in claim 1, wherein the sectional area of that particle which completes the subtotal of the sectional areas up to its own area size to 50% of the final total is at least 0.1 $\mu m^2$.

3. The sliding layer as claimed in claim 1, wherein the sectional area of that particle which completes the subtotal of the sectional areas up to its own area size to 50% of the final total corresponds to a maximum of seven times the sectional area of the particle completing the subtotal to 5% of the final total.

4. The sliding layer as claimed in claim 1, wherein the sectional area of that particle which completes the subtotal of the sectional areas up to its own area size to 50% of the final total corresponds to at least one fourth of the largest individual sectional area.

5. The sliding layer as claimed in claim 1, wherein the sectional area of that particle which completes the subtotal of the sectional areas up to its own area size to 50% of the final total is between 0.5 and 4 $\mu m^2$.

6. The sliding layer as claimed in claim 1, wherein the sectional area of that particle which completes the subtotal of the sectional areas up to its own area size to 50% of the final total corresponds to a maximum of six times the sectional area of the particle completing the subtotal to 5% of the final total.

* * * * *